United States Patent
Durney et al.

(10) Patent No.: US 8,894,294 B2
(45) Date of Patent: Nov. 25, 2014

(54) BEARING RETAINER

(71) Applicant: The Timken Company, Canton, OH (US)

(72) Inventors: Max W. Durney, San Francisco, CA (US); Keith A. Bell, Cleveland, OH (US); Brian Werner, Carrollton, OH (US); Doug H. Smith, Copely, OH (US)

(73) Assignee: The Timken Company, North Canton, OH (US)

( * ) Notice: Subject to any disclaimer, the term of this patent is extended or adjusted under 35 U.S.C. 154(b) by 13 days.

(21) Appl. No.: 13/835,516

(22) Filed: Mar. 15, 2013

(65) Prior Publication Data

US 2014/0169720 A1    Jun. 19, 2014

Related U.S. Application Data

(60) Provisional application No. 61/737,065, filed on Dec. 13, 2012.

(51) Int. Cl.

| F16C 33/46 | (2006.01) |
| --- | --- |
| F16C 33/66 | (2006.01) |
| F16C 33/54 | (2006.01) |
| F16C 33/49 | (2006.01) |
| F16C 33/50 | (2006.01) |
| F16C 33/41 | (2006.01) |
| F16C 33/42 | (2006.01) |

(52) U.S. Cl.
CPC ......... *F16C 33/4676* (2013.01); *F16C 33/6681* (2013.01); *F16C 33/541* (2013.01); *F16C 33/49* (2013.01); *F16C 33/502* (2013.01); *F16C 33/6629* (2013.01); *F16C 33/542* (2013.01); *F16C 33/547* (2013.01); *F16C 2226/78* (2013.01); *F16C 2226/52* (2013.01); *F16C 33/41* (2013.01); *F16C 33/427* (2013.01); *F16C 33/543* (2013.01)
USPC .......................................................... 384/578

(58) Field of Classification Search
USPC ......... 384/551, 572, 575, 577, 578, 579, 623; 29/898.065, 898.067
See application file for complete search history.

(56) References Cited

U.S. PATENT DOCUMENTS

| 837,830 | A | * | 12/1906 | Heinkel | ......................... 384/551 |
| 921,656 | A | * | 5/1909 | Alden | ........................... 384/565 |

(Continued)

FOREIGN PATENT DOCUMENTS

| DE | 10119889 | 11/2002 |
| EP | 0608629 | 8/1994 |

(Continued)

OTHER PUBLICATIONS

Search Report for International Appl. No. PCT/US2013/074304, dated Mar. 31, 2014, 6 pages.

(Continued)

*Primary Examiner* — James Pilkington
(74) *Attorney, Agent, or Firm* — Michael Best & Friedrich LLP

(57) ABSTRACT

A bearing cage for use with a plurality of rolling elements in a bearing assembly includes a plurality of bridge elements arranged to separate the rolling elements from each other and to retain the rolling elements in alignment in the bearing assembly. Each of the bridge elements is formed of sheet material bent to define a partially hollow component. The cage further includes at least one rim element connecting the plurality of bridge elements.

29 Claims, 13 Drawing Sheets

(56) References Cited

U.S. PATENT DOCUMENTS

| | | | |
|---|---|---|---|
| 1,169,469 A | | 1/1916 | Dunning |
| 1,365,596 A | * | 1/1921 | Lockwood ............ 384/578 |
| 1,598,025 A | * | 8/1926 | Stevens ............... 384/575 |
| 1,774,329 A | * | 8/1930 | Hutchinson ........... 384/575 |
| 2,591,160 A | * | 4/1952 | Kilian ................. 384/575 |
| 3,438,685 A | | 4/1969 | Teufel |
| 3,624,815 A | | 11/1971 | Schweitzer |
| 4,192,560 A | | 3/1980 | Hartnett |
| 5,335,416 A | | 8/1994 | Alling |
| 6,666,585 B1 | | 12/2003 | Kotzalas et al. |
| 6,969,202 B2 | | 11/2005 | Kackowski |
| 7,152,450 B2 | | 12/2006 | Durney et al. |
| 7,350,390 B2 | | 4/2008 | Durney et al. |
| 7,412,865 B2 | | 8/2008 | Durney |
| 2010/0122563 A1 | | 5/2010 | Durney |

FOREIGN PATENT DOCUMENTS

| | | |
|---|---|---|
| EP | 0742747 | 11/1996 |
| FR | 956989 | 2/1950 |
| WO | 2013052822 | 4/2013 |

OTHER PUBLICATIONS

Written Opinion for International Appl. No. PCT/US2013/074304, dated Mar. 31, 2014, 5 pages.

* cited by examiner

BEARING RETAINER

CROSS REFERENCE TO RELATED APPLICATIONS

This application claims benefit of priority to U.S. Patent Application Ser. No. 61/737,065 titled "Bearing Retainer" and filed Dec. 13, 2012, which is incorporated herein by reference in its entirety.

FIELD OF THE INVENTION

The invention relates generally to rolling element bearings and more particularly to bearing retainers or cages configured to periodically contact the rolling elements for alignment and guidance in a bearing assembly.

BACKGROUND

Current commercially available rolling element bearing retainers are produced using various means of manufacturing in order to produce either a monolithic retainer or a retainer which is a system of repetitive elements that separate individual rollers and are then joined to form a retainer that guides the entire system of rollers in a single rolling element bearing. Existing designs are configured to contact the rolling elements as needed in a manner which maintains the intended rolling element alignment and spacing with respect to what the industry calls an inner and outer raceway. Rolling element bearings have multiple rolling elements, of which the size, shape, and material type vary and which determine the bearings' capacity.

SUMMARY

This specification uses the terms "bearing retainer" and "bearing cage" interchangeably. In one aspect, a rolling element bearing retainer may be produced entirely or primarily from sheet metal components or from components formed from other sheet materials. Production of the retainer may employ, for example, one or more of the following manufacturing processes: laser cutting, CNC punching, and/or stamping. The retainer may be configured to retain, for example, any rolling element in a bearing, including but not limited to rolling elements having cylindrical, tapered, spherical, barrel, or ball shapes. The retainer may comprise various sheet metal material parts which may be prepared for bending or other forming operations and remain substantially flat during their preparation, then be bent or otherwise formed into their final shape and joined together to provide a sheet material rolling element bearing retainer. The bending or other forming process may be a secondary process separate from preparation of sheet material blanks from which the components are formed. Alternatively, portions or all of the bending or other forming process can be integrated with the preparation of the flat sheet material blanks. For example, the components may be produced from a coil of sheet metal using a progressive stamping operation to arrive at a finished rolling element bearing retainer which embodies some or all of the features described in more detail below.

In another aspect, a rolling element bearing retainer comprises a plurality of bent or otherwise formed sheet metal sections, referred to in this specification as bridges, to separate the individual rolling elements and provide appropriate contact surfaces for the rolling elements. The bridges may have a substantially hollow cross-section, for example. By contact or intermittent contact with the rollers, the bridges maintain rolling element alignment and spacing as the inner and/or outer raceways and rolling elements rotate in the bearing. Bridges may be produced, for example, using substantially flat sheets of material that are prepared using a laser, CNC punch, or stamping/blanking operation, then subsequently bent or otherwise formed into a desired shape and joined to itself or to other retainer components in order to maintain the desired cross section of bridge when put under load via contact with the bearing rolling elements. The bridges may be interconnected with each other to form a series of connected bridges, referred to herein as a retainer section or bearing cage section. Such interconnection of bridges may be accomplished, for example, with one or more components referred to herein as rims or bridge-connecting rims that interconnect ends of the bridges. The bridges may be interconnected to each other by rims at both ends, with the interconnected bridges thus bridging the gap between the rims. Alternatively, bridges may be interconnected by a rim at only one end, or not be interconnected but instead float in the bearing retainer with their positions constrained primarily by contact with the rolling elements. Two or more bearing cage sections may be connected to each other with a component referred to herein as a splice. A retainer for a given bearing design may comprise one or more, e.g. many, such bearing cage sections as suitable.

Bearing retainers and retainer fabrication processes disclosed herein may provide numerous advantages compared to conventional designs and fabrication methods. Such potential advantages include the following.

Low cost manufacturing may be possible at various volumes of retainers based on scalable sheet metal manufacturing processes. For low volumes, CNC processes such as, for example, laser cutting, water jet cutting, and punching may be most suitable. Larger volumes may be cost effectively accommodated by higher speed manufacturing processes such as, for example, metal stamping or progressive metal stamping.

There may be little or no tooling cost for low volume applications due to the availability of standard sheet metal processing techniques as listed above, for example.

Modularity—optional configurations and variable numbers of bridges, bearing cage sections, bridge connecting rims, and rolling elements, for example—may enable optimized sheet material utilization (i.e. reduction of scrap), improved overall bearing capacity, and other advantages.

In some designs "snap-in" or "slide-in" rolling elements may be held by the retainer independent of whether the rolling elements are assembled onto the bearing raceways. This feature may improve ease of assembly and disassembly of the bearing.

The number of retainer contact surfaces between the bridges and the rolling elements may be adjusted, for example, by varying the cross sectional shape of the bridges or adding additional features providing more points of contact.

The number of rolling elements in a given size/class of rolling element bearing may be increased, compared to conventional retainer designs, due to the bridge cross section design options available using bent or otherwise formed sheet material. In some variations, it is possible to alter the bridge cross section using embossed/formed metal features which vary the separation of features of the bridge cross section. It is also possible to choose different thicknesses of sheet material in order to alter the circumferential gap between rolling elements.

Overfilling of the bearing with grease, oil, or other lubricant may be accommodated by substantially hollow bridge cross sections and ports (e.g., apertures and scallops) into them.

Tab and slot connections may be used between retainer components. Hence retainers may not require welding or separate fasteners.

Retainer component blanks may be prepared, shipped, and stored as flat or substantially flat products, then subsequently bent or otherwise formed into desired configurations.

Various sheet metal (or other sheet material) types and grades may be used. Changes in material type and grade may be successfully accommodated by minor changes in design configuration.

Retainer diameter may be adjusted by varying splice design with or without inter-engaging fingers on the ends of bearing cage sections. This may provide a simple means by which desired dimension tolerances from retainer to rolling element may be maintained independent of typical variation in bearing raceway diameter variation.

Retainers may be bent or otherwise formed from sheet materials other than metals, which may allow use of alternative joining techniques suitable for non-metallic materials.

These and other embodiments, features and advantages of the present invention will become more apparent to those skilled in the art when taken with reference to the following more detailed description of the invention in conjunction with the accompanying drawings that are first briefly described.

DETAILED DESCRIPTION

The following detailed description should be read with reference to the drawings, in which identical reference numbers refer to like elements throughout the different figures. The drawings, which are not necessarily to scale, depict selective embodiments and are not intended to limit the scope of the invention. The detailed description illustrates by way of example, not by way of limitation, the principles of the invention. This description will clearly enable one skilled in the art to make and use the invention, and describes several embodiments, adaptations, variations, alternatives and uses of the invention, including what is presently believed to be the best mode of carrying out the invention. As used in this specification and the appended claims, the singular forms "a," "an," and "the" include plural referents unless the context clearly indicates otherwise.

This specification discloses rolling element bearings and particularly rolling element bearing retainers or cages, their components, and related methods by which the rolling element bearing retainers may be manufactured, assembled, and used. As illustrated in the various figures, the disclosed rolling element bearing retainers may be used, for example, in a tapered or spherical rolling element bearing configuration to provide contact surfaces that intermittently guide and may align the rolling elements of a bearing to the raceways. The bearing retainers may receive various loads due to different surface interaction types (sliding, bearing, etc.) and hence various loads delivered by contact with rolling elements as the raceways and rolling elements rotate about a central bearing axis. Various configurations and applications for the disclosed rolling element bearing retainers will be described below.

Figure 1:
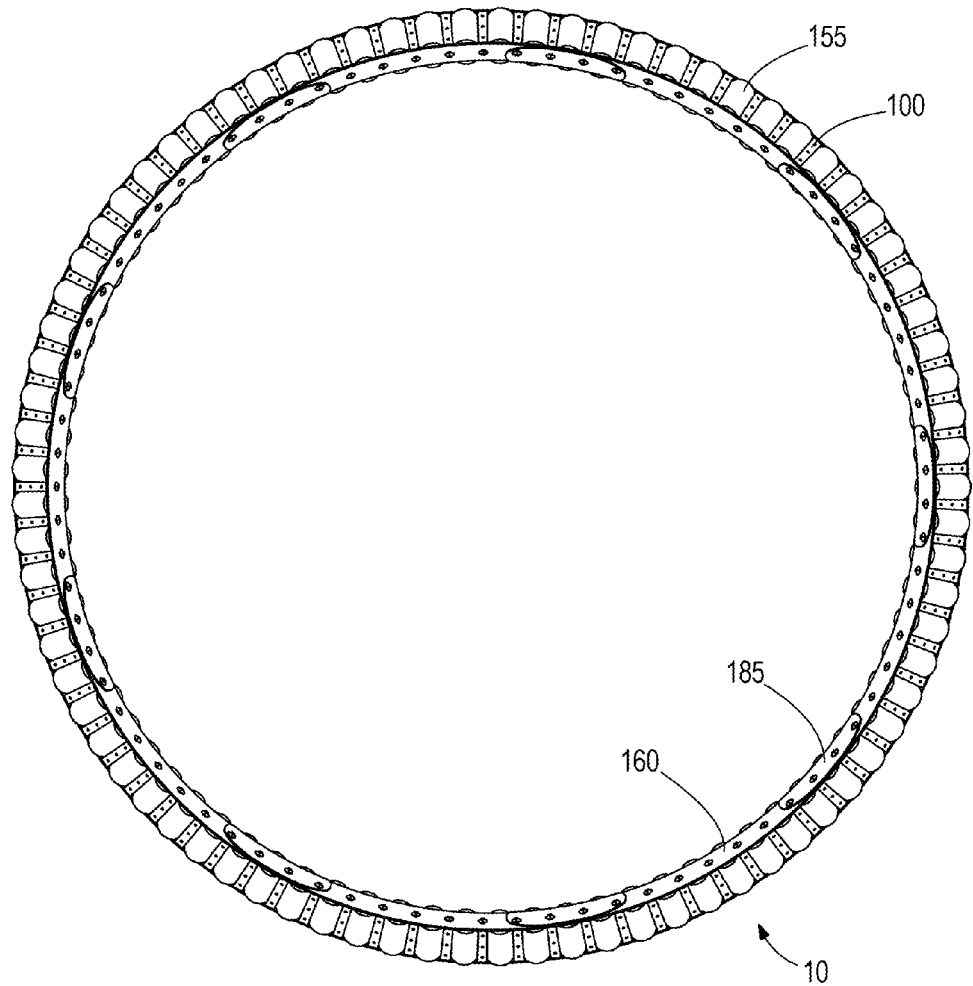
FIGS. 1-3 show, respectively, narrow end, wide end, and side views of an example tapered rolling element bearing retainer with the rolling elements in place.
Figure 2:
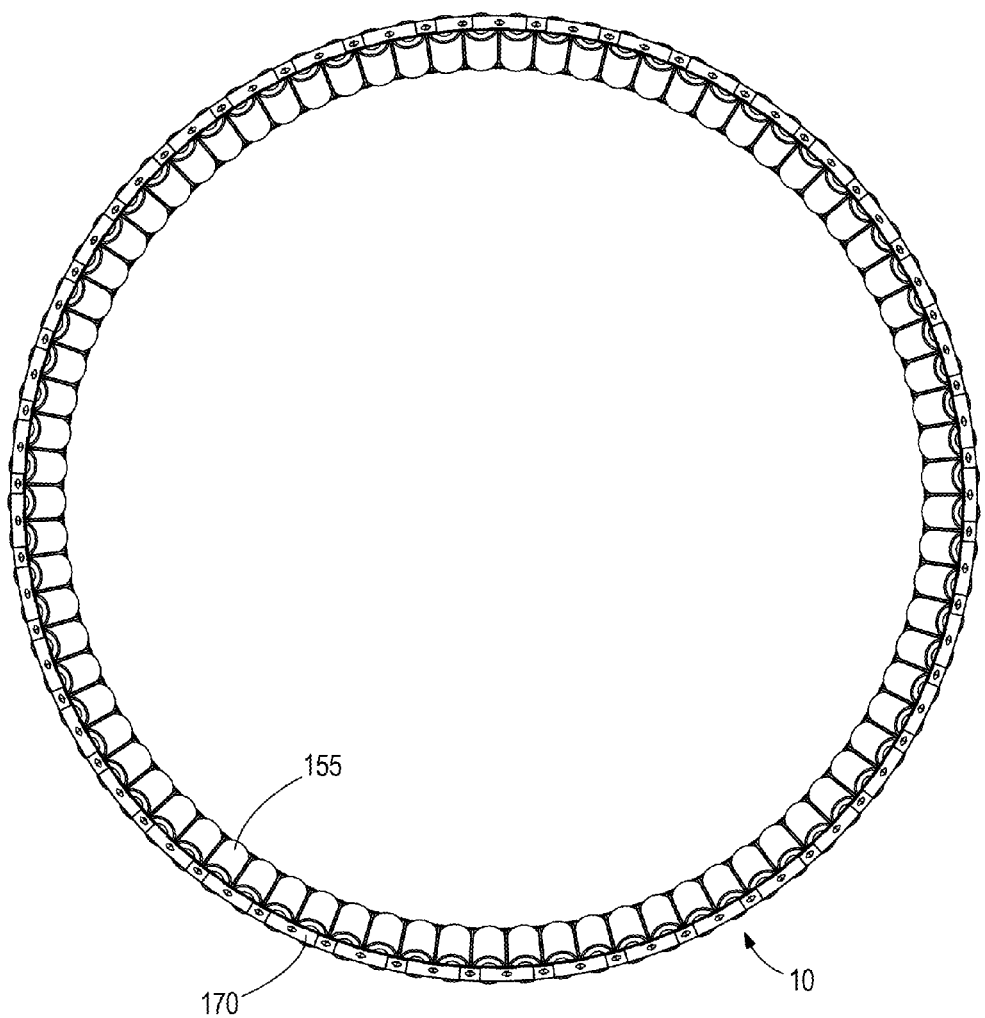
Figure 3:
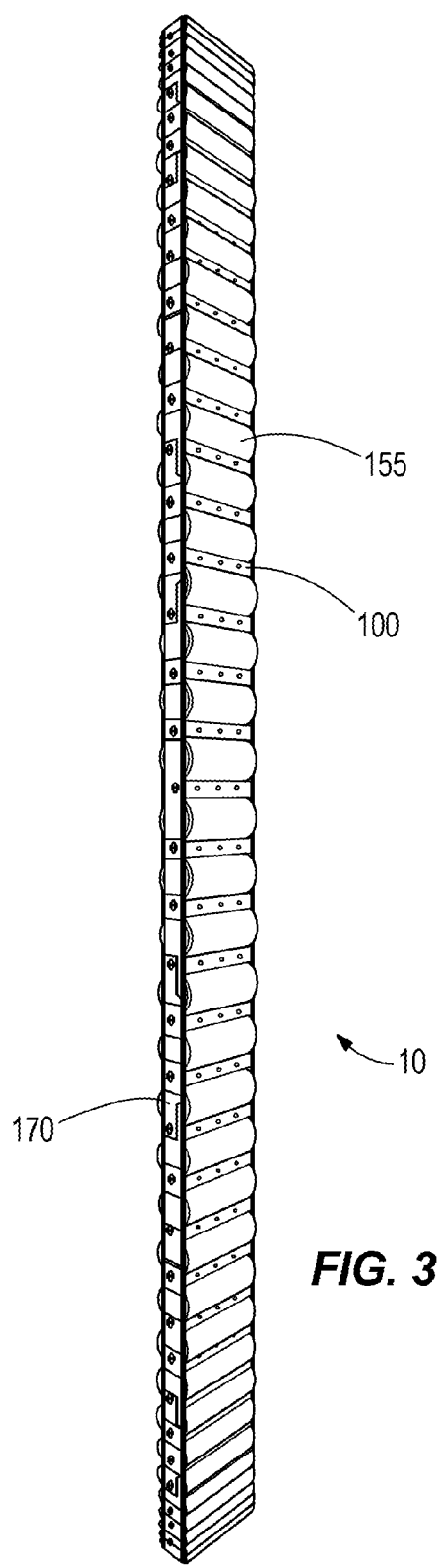

Referring now to FIGS. 1-3, an example sheet metal tapered roller bearing retainer 10 configured to retain rollers 155 is illustrated in various views. These figures illustrate a fully assembled roller bearing retainer, components and portions of which are also illustrated, for example, in FIGS. 8-18. The example bearing retainer comprises bridges or bridge elements 100, which in the illustrated example are integrally formed with a rim or rim element that interconnects one end of each bridge to form inner bearing cage sections 165 or outer bearing cage sections 160 (FIGS. 8-9), bridge connecting rims 170 (FIG. 10) interconnecting the other ends of the bridges, and splices 180 and 185 (FIGS. 12A-12B) interconnecting bearing cage sections (FIG. 14).

Bridges 100 are the main component of the retainer that can contact the rolling elements and provide surfaces that keep the rolling elements in alignment with the raceways during bearing rotation. Bridges 100 are bent or otherwise formed from sheet materials. Blanks for bridges 100 may be prepared, for example, using CNC laser cutting, CNC punching, water jet cutting, milling, metal stamping, casting, plastic injection molding, or any other suitable process, to enable precise forming and/or joining to occur. Bridges 100 may also be produced by progressively stamping the components from a coil of sheet metal.

Figure 8:
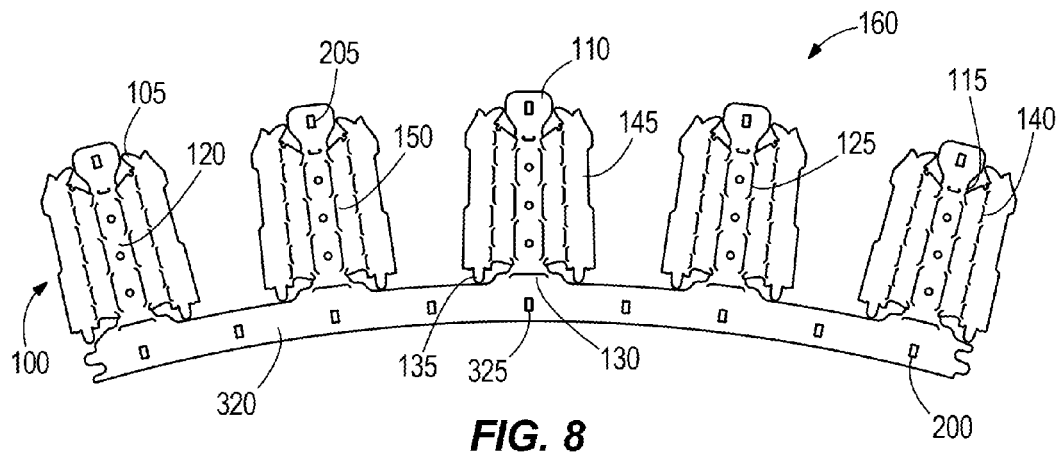
FIGS. 8-10 show, respectively, an example outer bearing cage section comprising bridges integral with a bridge-connecting rim, an example inner bearing cage section comprising bridges integral with a bridge-connecting rim, and an example bridge connecting rim.
Figure 9:
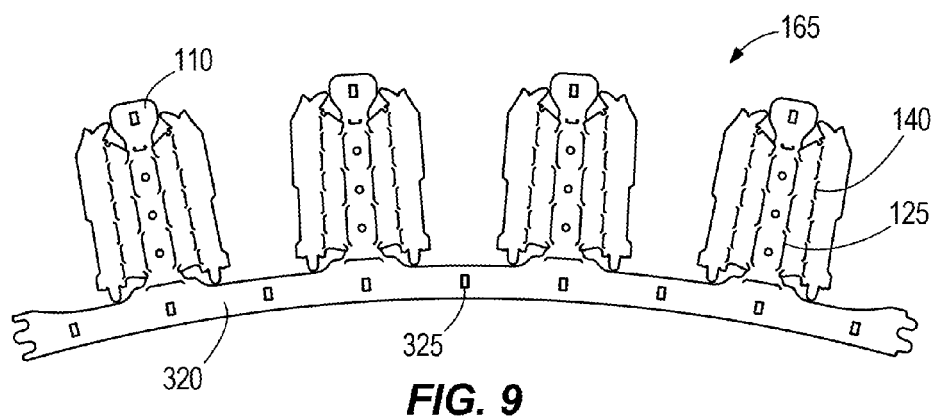
Figure 10:
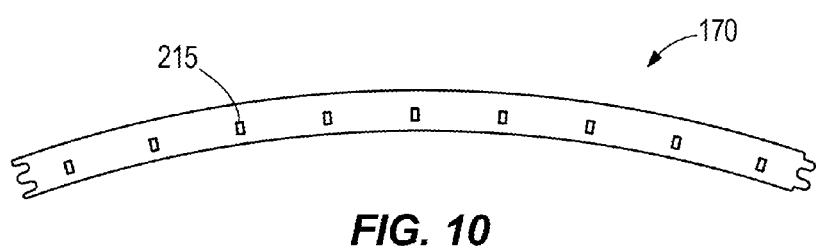

Although bridges 100 in the example bearing retainer of FIGS. 1-3 are formed integrally with interconnecting rims as shown in FIGS. 8-9, they may instead be formed as discrete components that are interconnected along one or both ends, for example, with rims similar to rim 170 of FIG. 10.

Figure 4:
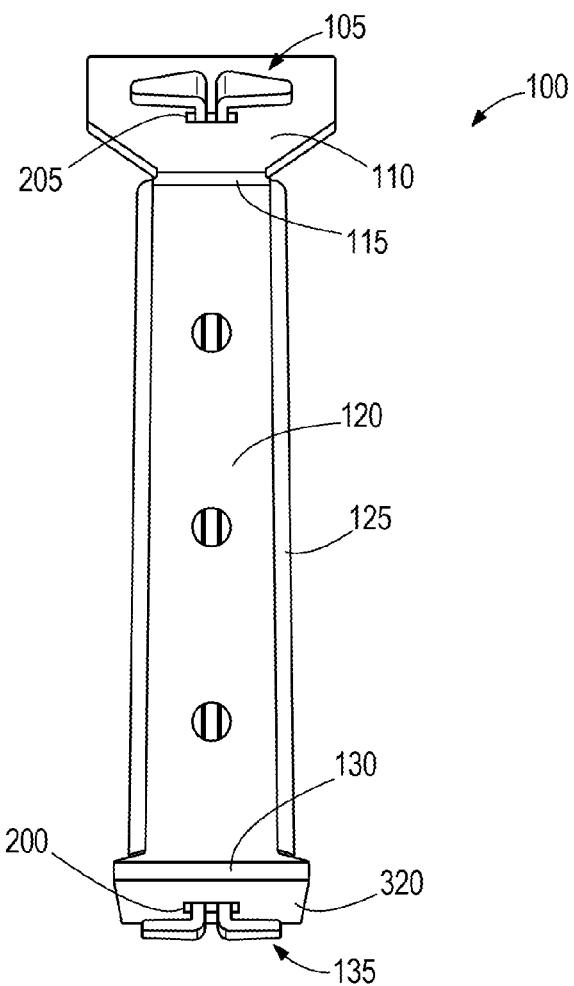
FIGS. 4-5 show an example bridge.
Figure 5:
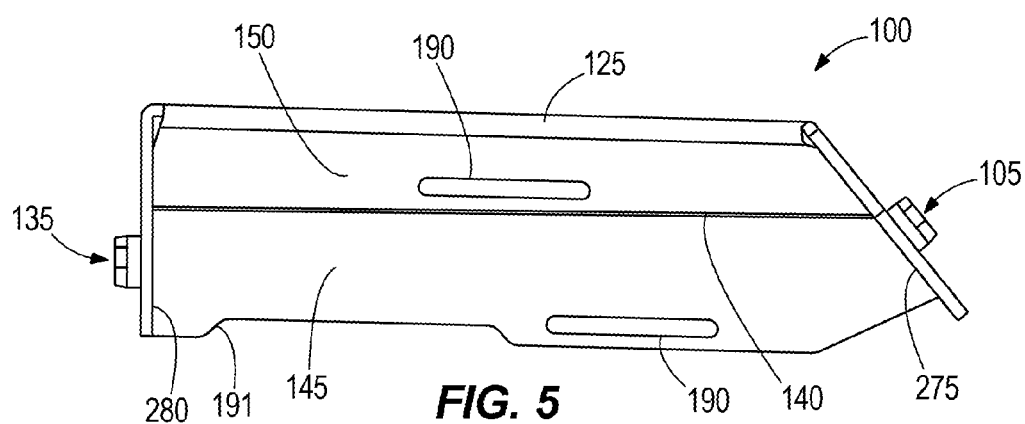
Figure 6:
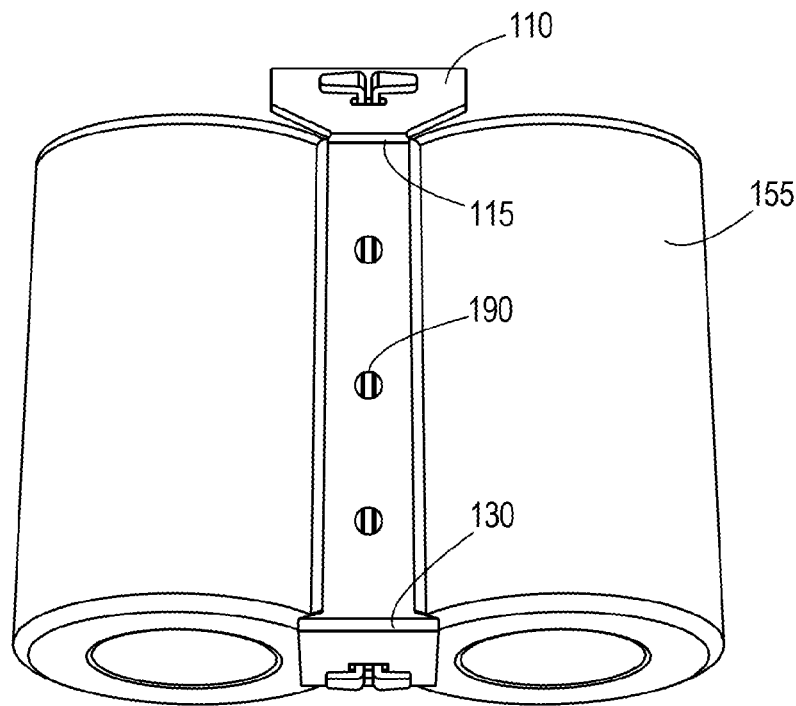
FIGS. 6-7 show the example bridge of FIGS. 4-5 in combination with adjacent rolling elements.
Figure 7:
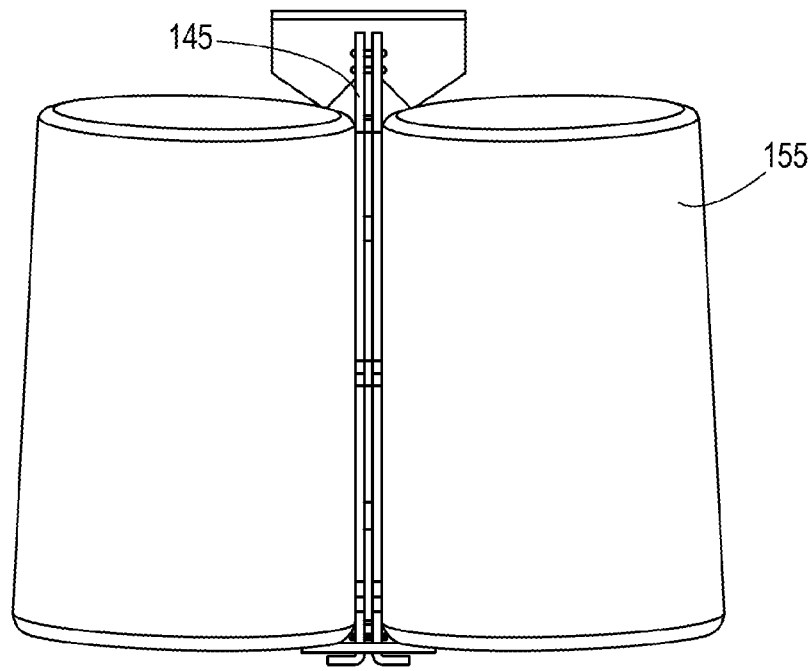
Figure 15:
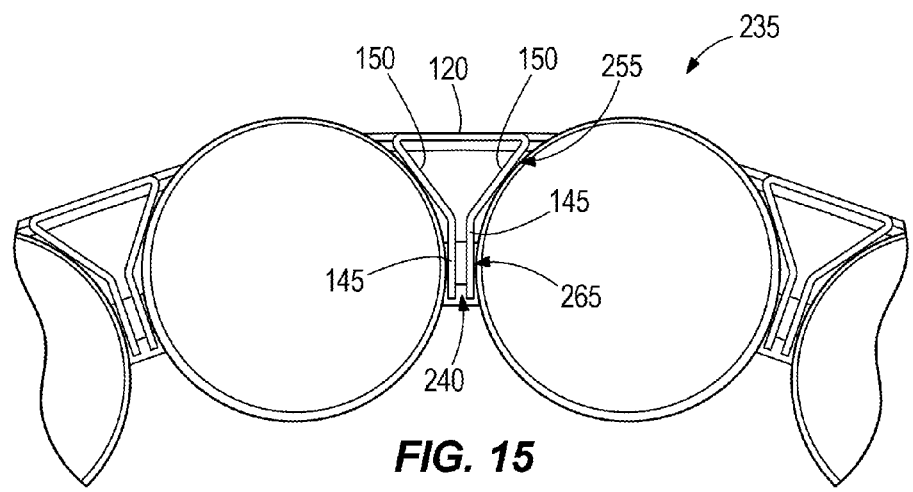
FIG. 15 shows a cross section view, cut through the large diameter end of an example tapered rolling element bearing retainer, and particularly the substantially hollow cross section of an example bridge and clearances (gaps) between the bridge and the rolling elements.
Figure 16:
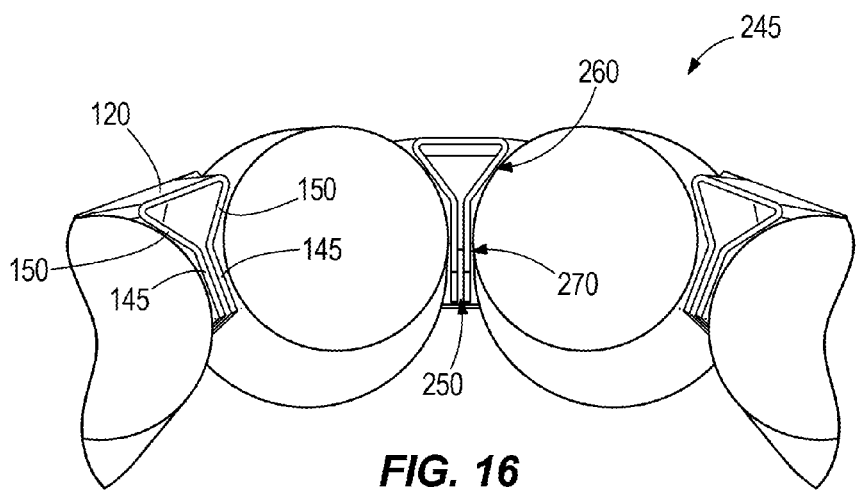
FIG. 16 shows a cross section view, cut through the small diameter end of the tapered rolling element bearing retainer of FIG. 15, and particularly the substantially hollow cross section of a the same bridge and clearances (gaps) between the bridge and the rolling elements equivalent to those seen in FIG. 15.
Figure 23:
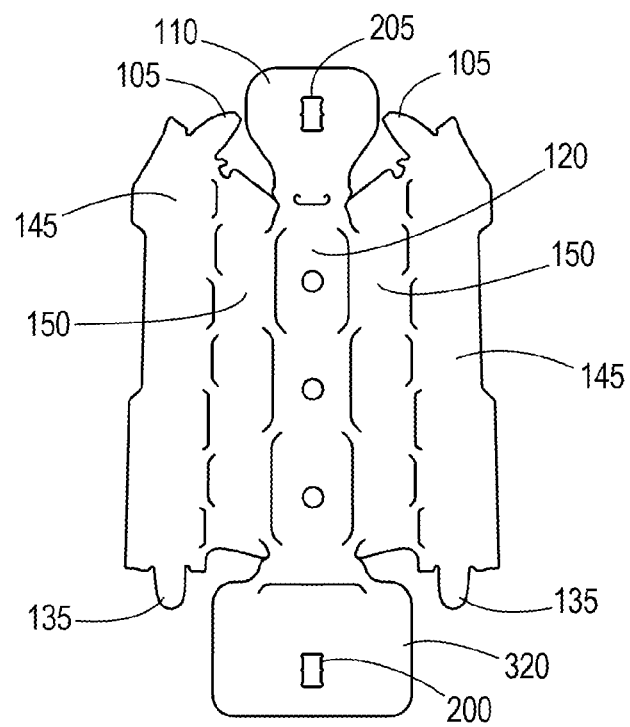
FIG. 23 shows a sheet material blank from which may be formed an example individual bridge as depicted in FIG. 4 and FIG. 5.

A bridge 100 formed as a discrete component is shown in FIGS. 4-5, and shown in place between two rolling elements in FIGS. 6-7. FIG. 23 shows a blank from which such a discrete bridge may be formed. The discrete bridge of FIGS. 4-7 has features generally corresponding to those of the integrally formed rim-connected bridges of FIGS. 8-9. Bridge 100 illustrated in FIGS. 4-7 comprises a back panel or bridge back 120 which typically is positioned nearest to the outer race, (e.g., wing-like) panels or wings 150 defined by bend lines 125 that define first and second opposite side edges of the bridge back 120, (e.g., blade-like) inter-rolling element panels or blades 145 defined by bend lines 140, optional end flanges or petals 110 defined by bend lines 115 that define first and second opposite ends of the bridge back 120, and an optional rim portion or end flange 320 defined by bend lines 130. In the illustrated example, a joining technique of formed tabs 105 and 135 at either end of the bridge 100 is used in combination with other retainer components to secure bridge 100 in the desired cross sectional configuration. This cross section shape is most clearly shown in FIGS. 15-16. Specifically, the bridge back 120 and wings 150 together define a hollow portion of the bridge 100 by virtue of each of the wings 150 being bent relative to the bridge back 120 to define an acute angle therebetween. As shown in FIGS. 15 and 16, this results in a generally hollow triangular shape in cross section.

The precision of the cross section of a formed sheet metal bridge 100 may be improved using hard (physical) stops 275 and 280 (FIG. 5) and may be further improved when coupled with a joining method such as engagement of tabs 105 with slots 205 and tabs 135 with slots 200. Such use of physical stops 275 and 280 may refer, for example, to using the inter-rolling element panel or blade 145 edges as the stop mechanism for bends along bend lines 115 and 130 to limit the bending of the petals 110 relative to the bridge back 120. The tab and slot closure method may be used to help ensure that the panel 150 and inter-rolling element panel 145 bends, at bend lines 125 and 140 respectively, occur at or near the desired angles.

Figure 17A:
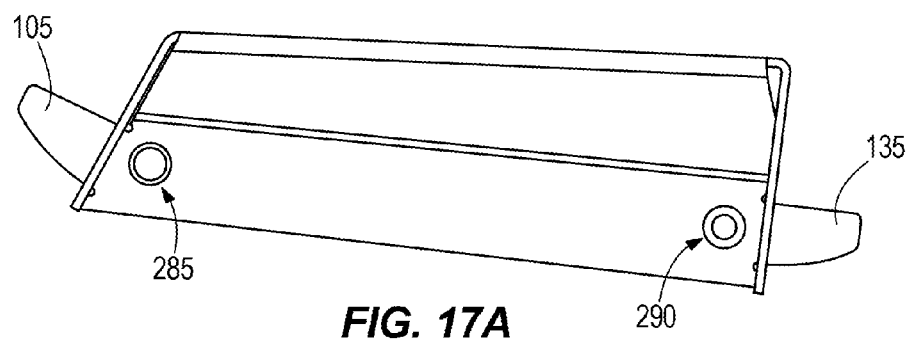
FIGS. 17A-17B show two perspective views of an example bridge that comprises embossments (dimples) which are used to positively separate (e.g., blade-like) panels on the bridge to a desired gap distance.
Figure 17B:
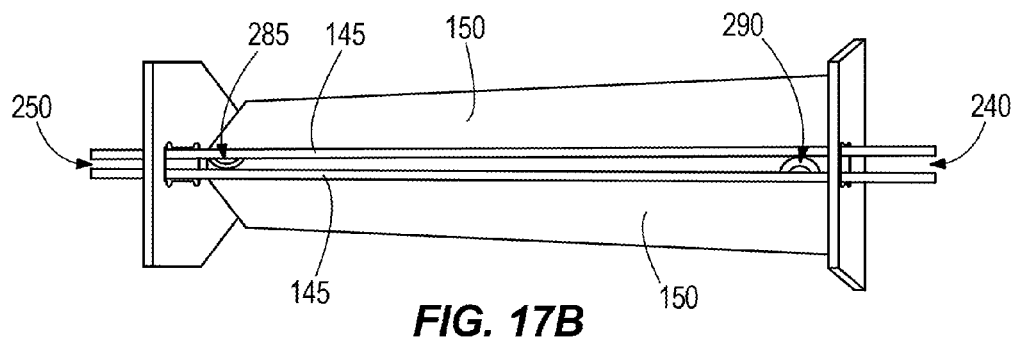

Another mechanism for precisely controlling the cross section of a bridge element is demonstrated in FIGS. 17A-17B, which illustrates the use of embossments (e.g., formed dimples or other protrusions) 285 and 290 in the sheet material to form spacers on either end of the rolling element. Features 285 and 290 maintain desired minimum dimensions for gaps 250 and 240 between the inter-rolling element panels 145 at either end of the rolling element. In the case of a tapered roller bearing, the intended gaps 240 and 250 are of different magnitudes, due to the taper of the roller. In order to accommodate the different gap dimensions, features 285 and 290 are displaced out of plane with respect to inter-rolling element panels 145 to two different distances. Use of spacer features such as protrusions 285 and 290 is a design option that allows for independent choices for the sheet material thickness and the gap distance between the rollers and bridge panels 145 and 150. For example, the dimensions of gaps 255, 260, 265, and 270 shown in FIGS. 16-17 may be controlled with precision by use of protrusions 285 and 290. This ability to use a desired thickness of material for rolling element contact duty independent of the choices for the dimensions of gaps 240 and 250 in part allows the number of rolling elements in a given bearing application to be substantially increased, hence providing more bearing load capacity and/or longer bearing life. The ideal location, size, quantity, and shape of features 285 and 290 may be optimized for a given bearing application. With the use of spacers such as spacers 285 and 290, inter-rolling element panels 145 may be formed from thin sheet material and yet accept significant contact loads that would otherwise cause two adjacent rolling elements to contact one another if the panels 145 were not present or were unable to handle the loads. The ability to use thin sheet material for panels 145 in this manner allows rollers 155 to be placed closer together in the bearing, and thus allows the number of rolling elements in a bearing of given size to be increased. Advantageously, and in contrast to many conventional retainer designs, retainers as disclosed herein may provide a contact surface at the smallest gap location between two rolling elements.

Also important is the ability to maintain a structurally sound retainer design when increasing rolling element count. In contrast to retainer configurations as disclosed herein, traditional retainer designs do not typically allow rolling element count to increase while maintaining the same structural integrity.

Figure 18:
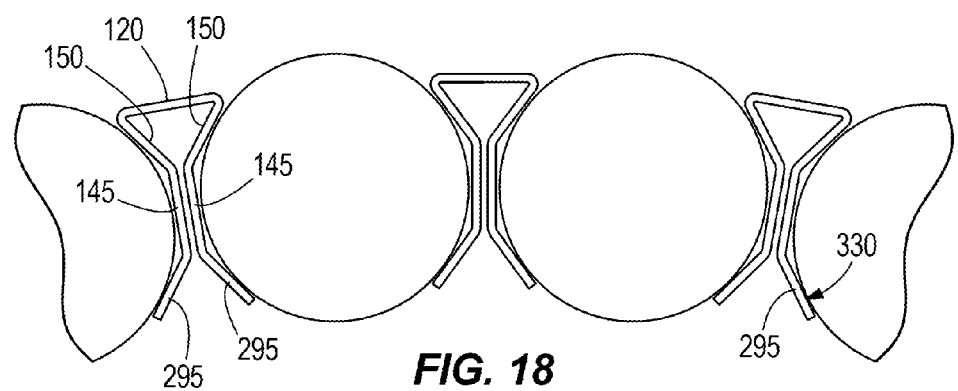
FIG. 18 shows an example bridge cross section comprising additional (e.g., wing-like) panels that increase the included angle (wrap) of a rolling element.

Further, many traditional retainer designs have solid cross section bridges that make contact with a rolling element only at a single line of contact which must receive loads oriented both circumferential to and radial to a central axis of rotation of a bearing. This may result in a compromise in design in order to establish a position for the bridge to contact the rolling element whereby the single line of contact can adequately handle the various load orientations delivered to it through contact with rolling elements. In contrast, retainers as disclosed herein include bridges that may provide multiple lines or regions of contact between the retainer and roller 155. For example, bridges 100 may (e.g., intermittently) contact adjacent rollers 155 along gaps 255, 260, 265, 270, and 330 shown in FIGS. 15-16, and FIG. 18 to constrain and guide the position and alignment of the rolling elements. More specifically, outer surfaces of wings 150, blades 145, and bottom wings 295 may contact rolling elements to align and constrain the motion of the rolling elements. In FIGS. 15 and 16, a blade 145 and a wing 150 on one side of the bridge 100 together provide at least two angularly separated alignment-constraining regions for guidance of the rolling element on that side of the bridge 100. Likewise, the blade 145 and the wing 150 on the other side of the bridge 100 together provide at least two angularly separated alignment-constraining regions for guidance of the rolling element on that other side of the bridge 100. In the embodiment of FIG. 18, each bottom wing 295 provides a third angularly separated alignment-constraining region for guidance of the rolling element on the corresponding side of the bridge 100.

The example bridge in FIGS. 4-7 show tabs 105 and 135 in their final formed shape, with a gap present between tabs 105 and flange 110 and likewise a gap present between tabs 135 and tapered rim 320. The reason for this gap will become apparent in the following discussion of FIGS. 8-14.

FIGS. 8-9 show the flat, prepared sheet material blanks for an inner bearing cage section 165 and for an outer bearing cage section 160. These blanks may preferably be produced using either CNC laser or water jet cutting, and optionally incorporates Industrial Origami, Inc bend-facilitating smile shaped slits at bridge bend lines (115, 125, 130, and 140). The blank for outer bearing cage section 160 comprises five flat bridges 100 connected by and integral with a conical rim 320. Similarly, the blank for outer bearing cage section 165 comprises four flat bridges 100 connected by and integral with a tapered rim 320. Rims 320 are described in this example as "tapered" because of the shape they assume in an assembled bearing cage for a tapered roller bearing. Rims 320 would not necessarily be tapered in other rolling element bearing configurations. Bearing cage sections 165 and 160 are referred to as "inner" and "outer" because in the assembly process described below they are positioned with rim sections 320 overlying each other, with bearing section 165 to the inside of the bearing retainer. Each bridge 100 of the inner cage section 165 is positioned between a pair of bridges 100 of the outer cage section 160. In alternative embodiments, bridges 100 may be similar or substantially identical to those shown in FIGS. 8-9 except for being formed as discrete component (e.g., see FIGS. 4-5 and 23), which could be interconnected to each other by attachment to a rim.

Figure 11:
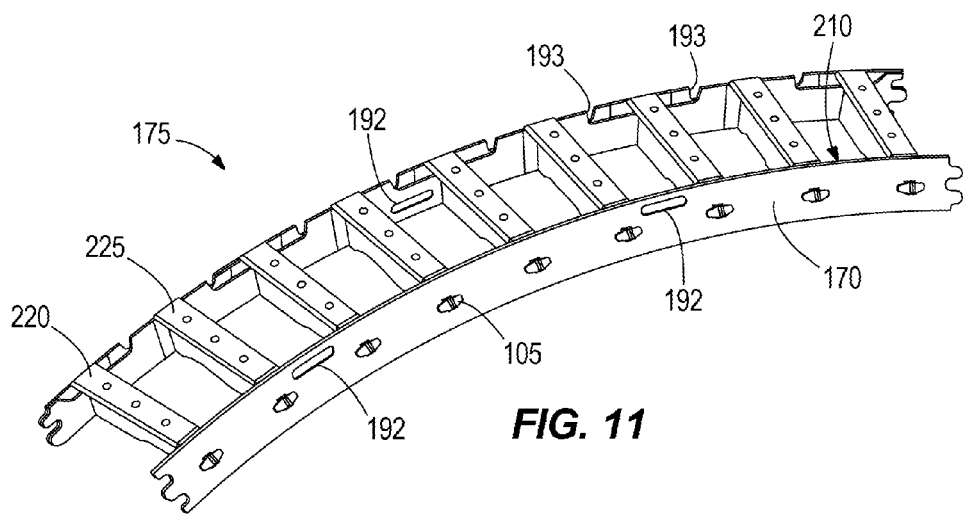
FIG. 11 shows an example assembled bearing cage section.
Figure 12A:
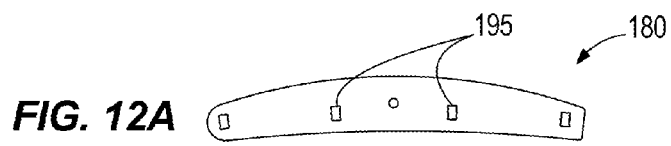
FIGS. 12A-12B show example splices that may be used to connect two or more bearing cage sections in a tapered rolling element bearing retainer, one example splice configured for one rolling element end and another example splice configured for the other rolling element end.
Figure 12B:
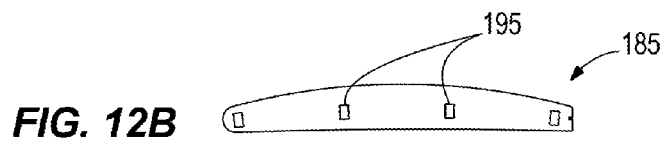

The example outer bearing cage section 160 and inner bearing cage section 165 illustrated in FIGS. 8-9 may be assembled with the bridge-connecting rim or third rim element 170 shown in FIG. 10 to provide example bearing cage section 175 shown in FIG. 11. In this example, rim 170 assumes a planar configuration in the fully assembled tapered roller bearing retainer, but would not necessarily take this shape in other rolling element bearing configurations. One example assembly sequence is as follows. First, bends along inter-rolling element panel bend lines 140 are formed to the intended angle. Next, bends along panel 150 bend lines 125 are formed to the intended angle. These steps are completed for both outer bearing cage section 160 and inner bearing cage section 165. When these steps are finished, each pair of inter-rolling element panels 145 on a given bridge 100 will be in close proximity to one another.

The next step is to overlap the outer and inner bearing cage sections 160 and 165 such that all the slots 325 on the tapered rims 320 align. After that, a bend along bend line 130 is formed to an angle controlled by physical stop 280 (FIG. 5), which causes tabs 135 to protrude through slots 325.

Figure 21:
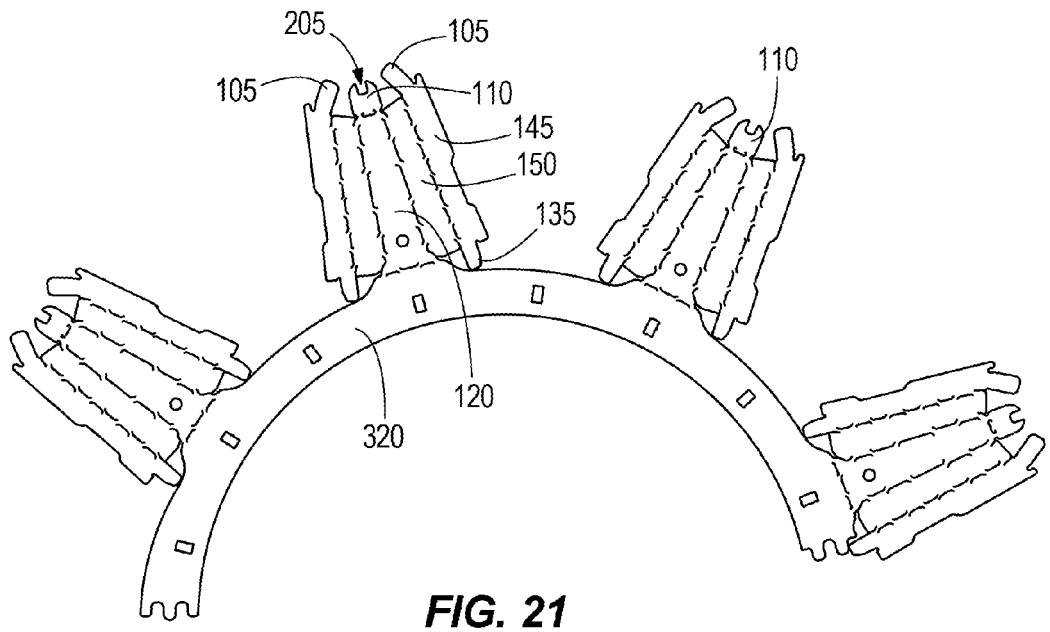
FIG. 21 shows another example of rim-connected bridges, with each bridge similar to those depicted in FIG. 4, FIG. 5, and FIG. 22 except for modifications to an end flange of the bridge.

At this stage tabs 135 are in the non-formed (unbent) state. The next step is to form (e.g., bend) tabs 135 which will then lay flat on the outside surface of the tapered rim 320 (i.e. with no gap between tabs 135 and conical rim 320) of the outer bearing cage section 160. If splices 180 and 185 are to be used to connect two bearing cage sections 175 (FIG. 14), the relevant tabs 135 should pass through both tapered rims 320 (inner and outer bearing cage sections 160 and 165) as well as through slots 195 on splices 180 and 185, and are left in the non-formed state until the splices 180 and 185 are placed to join the two bearing cage sections. Once tabs 135 are formed (bent), the next step is to form all the flanges 110 by bending them along bend lines 115 to a bend angle controlled by physical stop 275 (FIG. 5). When flanges 110 are bent, tabs 105 are in the non-formed state and will protrude through slots 205. In the variation shown in FIG. 21, slot 205 is replaced with a notch 205 that performs a similar function—engagement of tab 105—but requires less material for flange 110.

Once all of flanges 110 are formed, the next step is to place the bridge connecting rim 170 in position on flanges 110 so that the non-formed tabs 105 protrude through slots 215 in rim 170. The larger radius edge of rim 170 may be beveled to provide a surface that contacts the ends of the rollers to constrain their positions along their axial directions. The bevel may advantageously provide a substantially planar contact with the roller end rather than an edge contact.

The final assembly step to produce bearing cage section 175 is to form all interior tabs 105 that are not intended to protrude through splice slots 195.

Figure 13:
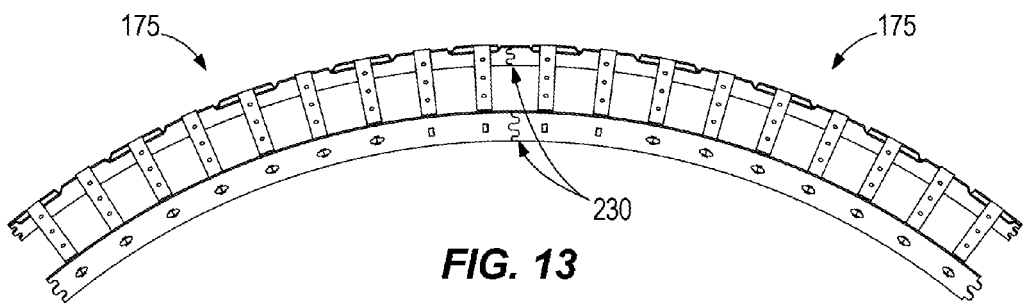
FIG. 13 shows two example bearing cage sections positioned to be connected by the example splices of FIG. 12.
Figure 14:
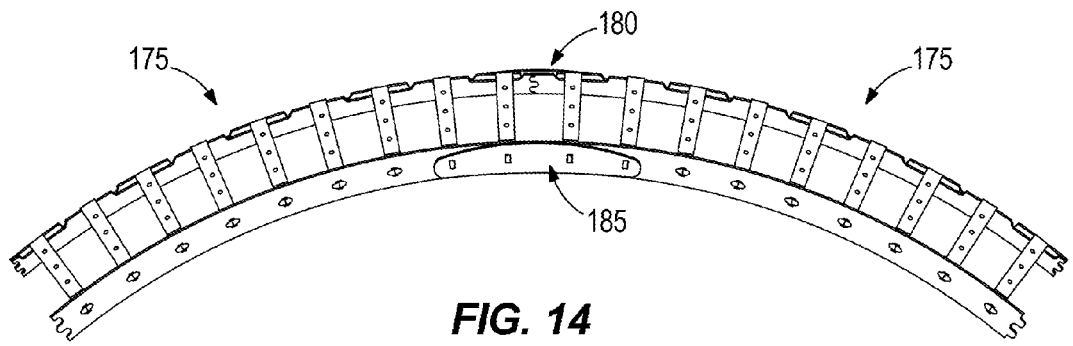
FIG. 14 shows the example bearing cage sections of FIG. 13 connected by splices.

After bearing cage sections 175 are assembled, multiple bearing cage sections 175 may be connected to one another using splices 180 and 185 as shown in FIGS. 13-14. In FIG. 13, two bearing cage sections 175 are positioned relative to one another using sliding engagement features (e.g., fingers) 230. These sliding engagement features allow for differently designed splices 180 and 185 to vary the overall diameter of a retainer. This is achieved in the splice 180 and 185 designs by changing the dimension between the two center slots 195. Once the bearing cage sections 175 are positioned relative to one another, splices 180 and 185 are placed over the non-formed (i.e., unbent) tabs 105 and 135, and subsequently formed (bent) to create a stable connection between the two bearing cage sections 175. This process can be repeated using multiple bearing cage sections 175 in order to produce a full 360 degree (or other overall circumferential dimension) sheet metal roller bearing retainer.

Alternatively, or in addition, a half shear or bridge lance technique known in the sheet metal industry may be used to form protrusions on the splices that engage corresponding slots on the connecting rims. Welds, fasteners including but not limited to screws and rivets, or any other suitable method may be used to attach the splices to the connecting rims or to reinforce the attachment methods described above to establish a more robust connection between two bearing cage sections.

FIGS. 15-16 further illustrate an example retainer for tapered roller bearings. In this case the rollers 155 have a varying cross section along their length which generally produces a truncated conical roller shape. Because the rollers 155 have a truncated conical shape, the sheet metal retainer benefits from panels or wings 150 and inter-rolling element panels or blades 145 that have contact surfaces that generally follow the roller 155 shape over its length in order to maintain a consistent design clearance (gap) along the roller length. This is illustrated by the multiple cut section views in FIGS. 15 and 16 which show constant clearances (gaps) 255, 260, 265, and 270. More generally, retainers as disclosed herein my include bridges 100 configured to follow the cross sectional shape of the roller to which it is designed to match, with an intended clearance.

Figure 24:
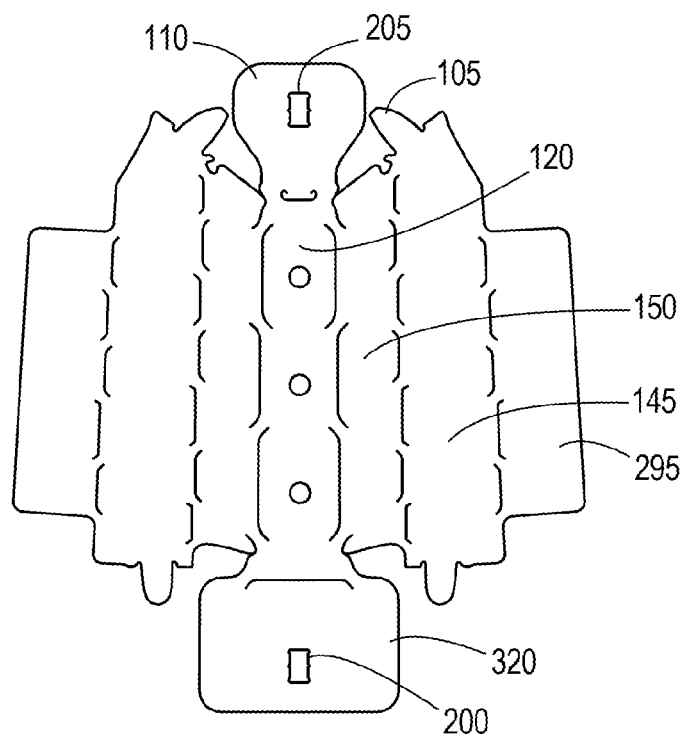
FIG. 24 shows a sheet material blank from which may be formed an example individual bridge as depicted in FIG. 18.

Now referring to FIG. 18, in another variation of the disclosed retainer the bridge elements further encompass the roller 155 circumference by including panels or bottom wings 295 extending from inter-rolling element panels or blades 145. FIG. 18 shows a cross-sectional view of bridge elements of this variation positioned between rollers. FIG. 24 shows a blank from which such a bridge element may be formed. Bridge elements of this variation may be formed either as discrete elements or integrally with a connecting rim. Advantageously, bridge elements of this variation may float in a bearing assembly, unconnected to each other, with their positions constrained primarily by contact with the rollers. In this regard, the bridge elements would be considered separators (using conventional terminology). Alternatively, bridge elements of this variation may be interconnected to form bearing cage sections similarly to as described above, with the bearing cage sections not spliced to each other but instead floating in the bearing retainer with their positions constrained primarily by contact between their bridges and the rollers.

Generally, a primary reason to interconnect bridge elements or to interconnect bearing cage sections is to keep bridge back panels 120 (or any other part of the bearing retainer) from contacting a raceway. In the variation of FIG. 18, panels or bottom wings 295 provide additional contact regions with rollers 155 that constrain the position of the bridge elements in the bearing retainer and prevent them from contacting the raceways even if the bridge elements are not connected to each other, or connected in bearing cage sections that are not spliced to each other. In the latter case, the bearing cage sections may bump each other end-to-end in the bearing retainer, or be prevented from bumping each other by position-constraining contact between panels 150, 145 and 295 with the rollers.

Alternatively, a feature such as an embossment or lance pushed out of plane from panel 145 could satisfy the same design intent as a panel 295.

Figure 25:
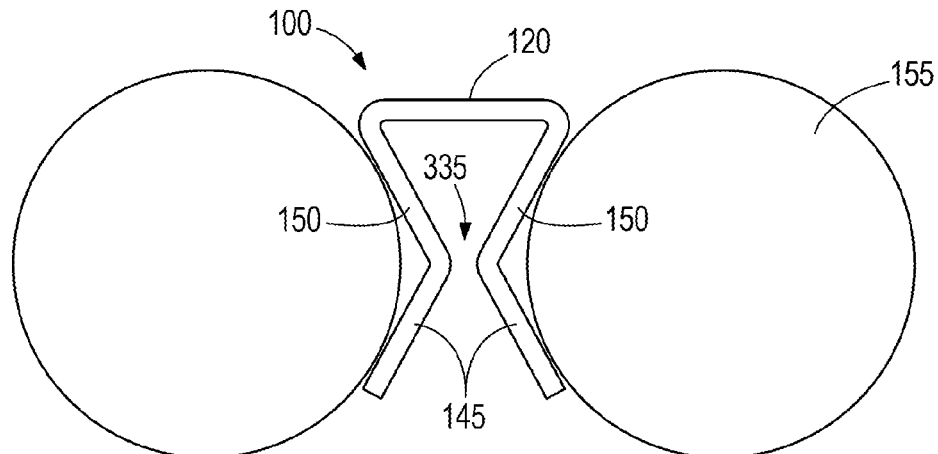
FIG. 25 shows a cross-sectional view of another example bridge positioned between two rolling elements.

Referring now to FIG. 25, another variation of bridge element 100 comprises a back panel or bridge back 120, panels or wings 150 extending from back panel 120, and panels or blades 145 extending from panels 150. Bridge elements of this variation may be formed either as discrete elements or integrally with a connecting rim. Panels 150 and panels 145 are configured to form a waist 335 located in or approximately in the narrowest region between two adjacent rollers 155. Contact regions between panels 145 and 150 and adjacent rollers 155 constrain the position of the illustrated bridge element 100 similarly to as occurs for the bridge variation of FIG. 18. In other words, the orientation of the blades 145 of FIG. 25 enables the blades 145 to function much like the bottom wings 295 of FIG. 18. The bridge element of this variation may float in a bearing retainer, unconnected to each other, with their positions constrained primarily by contact with the rollers. Alternatively, bridge elements of this variation may be interconnected to form bearing cages sections similarly to as described above, with the bearing cage sections not spliced to each other but instead floating in the bearing retainer with their positions constrained primarily by contact between their bridges and the rollers.

Figure 19:
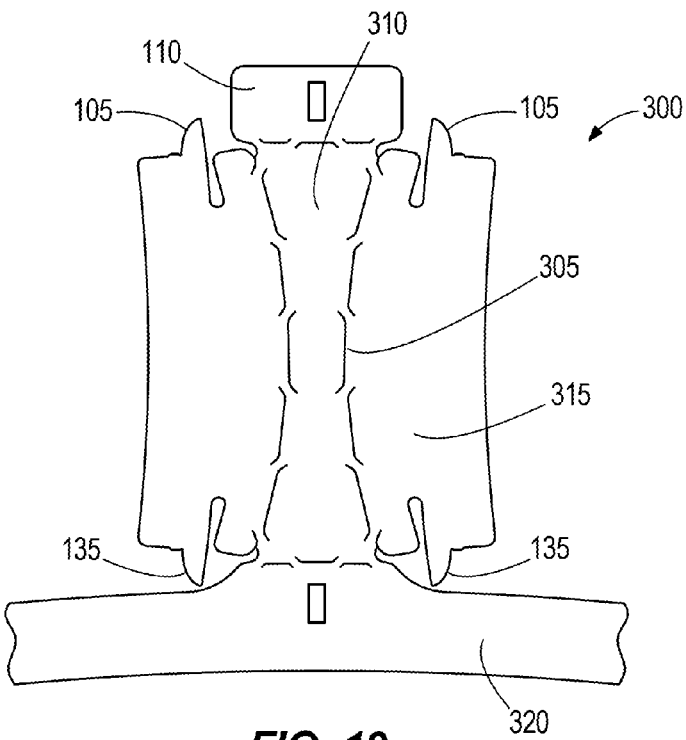
FIG. 19 shows an example bridge flat sheet material blank with curved bend lines which will cause the bent or otherwise formed sheet material to follow a generally curved surface of a rolling element.

Referring now to FIG. 19, in another variation an example bridge 300 comprises a curved bend line 305 which provides a curved back panel or bridge back 310 and curved panels or wings 315 upon bending. Back panel 310 is convex outward away from panels 315. Panels 315 assume a concave curvature that may be designed to generally conform, for example, to the curved surface of a ball or barrel shaped rolling element.

Figure 20:
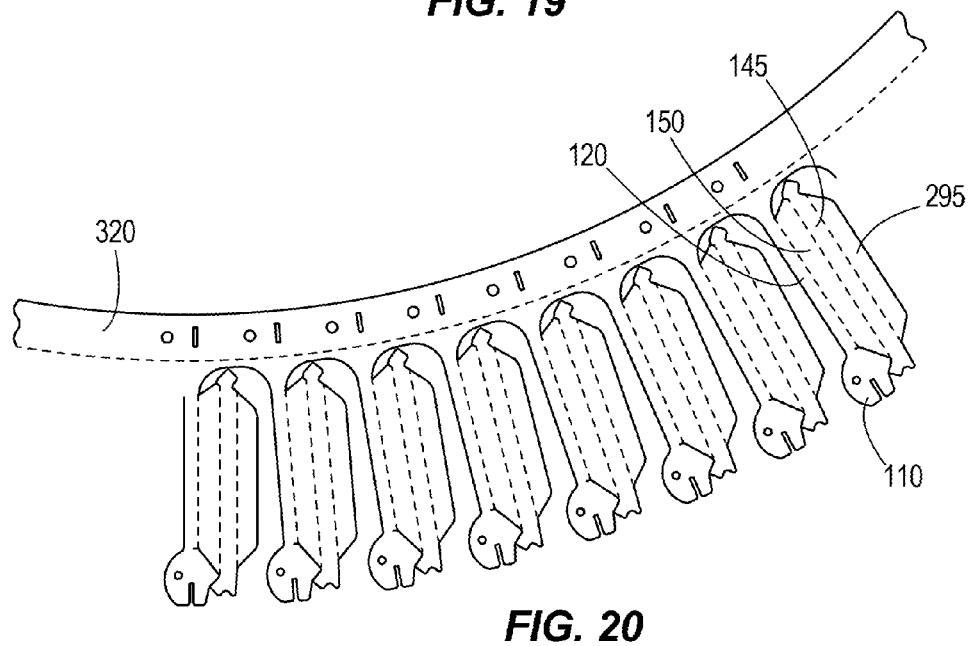
FIG. 20 shows another example of rim-connected bridges, with each bridge including a back panel to which is connected three panels that together form a structure having convex and concave surfaces to be inserted between adjacent rolling elements.
Figure 22:
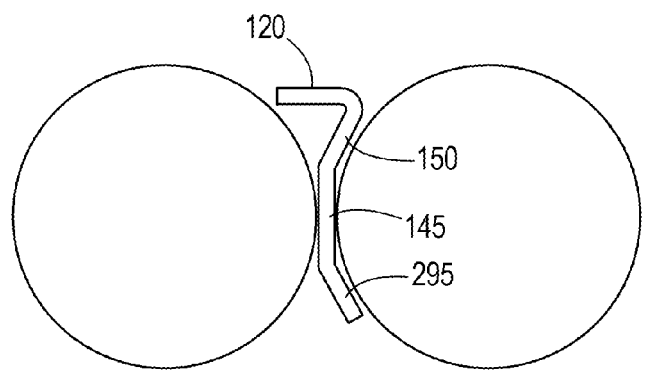
FIG. 22 shows a cross-sectional view of an example bridge of FIG. 20 positioned between two rolling elements.

Now referring to FIG. 20 (blank) and FIG. 22 (cross-section), in another variation each bridge element comprises a back panel or bridge back 120, a single panel or wing 150 extending from the back panel, an inter-rolling element or blade extending from panel 145, and a third panel or bottom wing 295 extending from inter-rolling element panel 145. Panels 150, 145, and 295 together form a structure having opposing convex and concave surfaces and configured to be inserted between a pair of adjacent rollers 155. The concave surface provides at least three contact regions with one of the rollers, and the convex surface provides at least one contact region with the other roller.

The interconnected bridge elements of FIG. 20 and FIG. 22 can be produced in either right-hand or left-hand mirror image variations. Each such bridge element is similar in form to either the right hand or left hand portion of a bridge element 100 variation of FIG. 18, and may be viewed as a "half-bridge" in comparison to the other bridge variations disclosed herein. Optionally, a right-hand variation of the blank shown in FIG. 20 and a complementary left-hand variation of the blank may be combined similarly to inner-bearing cage section 165 and outer-bearing cage 160, discussed above with respect to FIGS. 8-11, to form a bearing cage section. In doing so, in addition to overlapping rims 320, back panels 120 may also be overlapped and optionally joined to each other so that each pair of complementary right-handed and left-handed bridges 100 of FIG. 20 and FIG. 22 combine to form a bridge element similar to bridge 100 of FIG. 18. A similar approach using complementary right-handed and left-handed "half-bridges" based on the other bridge variations disclosed herein may also be used to form bearing cage sections.

Figure 26:
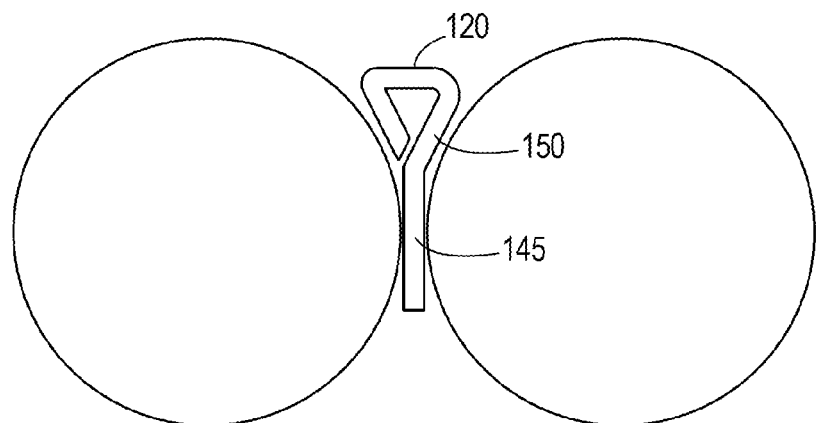
FIG. 26 shows a cross-sectional view of another example bridge.
Figure 27:
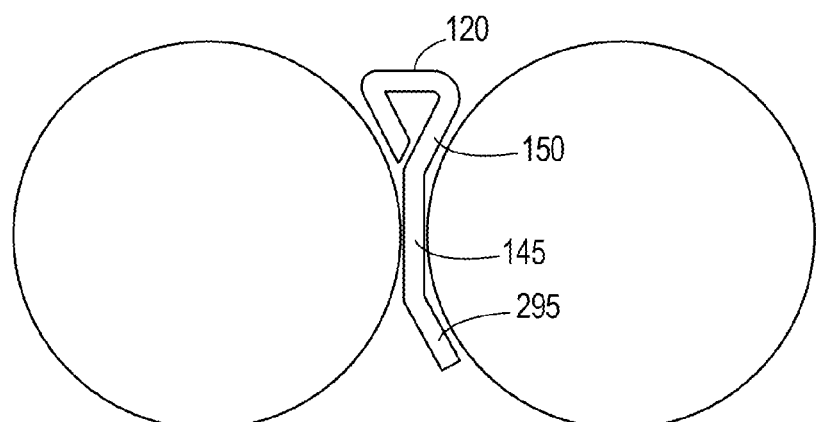
FIG. 27 shows a cross-sectional view of another example bridge.

Referring now to FIG. 26, another variation of bridge element 100 comprises a back panel or bridge back 120, panels or wings 150 extending from back panel 120, and only a single panel or blade 145 extending from one wing 150. Referring to FIG. 26, another variation of bridge element 100 is similar to the version illustrated in FIG. 26, but additionally includes a single panel or bottom wing 295 extending from the single blade 145. The operation of the bridges 100 illustrated in FIGS. 26 and 27 is like that described above with respect to FIGS. 15, 16, and 18 regarding the alignment-constraining regions. Bridge elements of this variation may be formed either as discrete elements or integrally with a connecting rim.

A bearing retainer may comprise bridges all having identically or substantially similar design, or instead comprise any suitable combination of bridge element variations.

Bearing retainers as disclosed herein may provide, or be modified to provide, an opening or space through which the inner or the outer race of the bearing may be inspected. For example, the bearing retainer may comprise two adjacent bridge elements that define an open region between them that is not occupied by a rolling element. In such variations, the positions of the adjacent bridge elements providing such an inspection port may be constrained to do so by, for example, one or more bridge-connecting rims. If bridge elements or bearing cage sections float in the bearing retainer, as described above, one or more of them may be temporarily removed to facilitate inspection of the inner race.

Any suitable sheet metal forming methods may be used in combination with the above teachings. For example, bend lines described above with respect to the fabrication of bearing retainer components may advantageously be defined in sheet material (e.g., sheet metal) blanks using slits, smile-shaped slits, fatigue-resistant slits, displacements formed by lancing, or other bend facilitating structures and methods disclosed, for example, in U.S. Pat. No. 7,152,449 titled "Techniques For Designing And Manufacturing Precision-Folded, High Strength, Fatigue-Resistant Structures and Sheet Therefor", U.S. Pat. No. 7,152,450 titled "method For Forming Sheet Material With Bend Controlling Displacements", and U.S. Patent Application 2010/0122563 filed Nov. 16, 2009 and titled "Method And Apparatus For Forming Bend-Controlling Straps In Sheet Material", all of which are assigned to Industrial Origami, Inc., and all of which are incorporated herein by reference in their entirety.

Many of the variations described above use tabs and slots to join one piece of sheet material to another. Tabs and slots are an example of complementary features integrally formed in sheet material and used to accomplish such joining More generally, any other suitable combination of integrally formed complementary features may be similarly used with components of the bearing retainers disclosed herein.

Bearing retainers and their components as disclosed herein may be formed from any suitable materials. For example, sheet metals of various mechanical and chemical properties, sheet plastics, or other sheet materials may be used. There may be a benefit to using a sheet metal material that has a larger modulus of elasticity in order to promote more of a springing of the bridge panels under load. The reason is that this would increase the "lines" or "regions" of contact to a slightly larger surface area of contact due to elastic deformation of the bridge panels.

A potential benefit of the bridge 100 cross sections described above with respect to the various figures is the ability they provide for a bearing cage section 175 to capture rollers 155 such that rollers 155 could be assembled into the bearing cage section prior to addressing the bearing cage section and rollers to either the inner or the outer bearing raceway for bearing assembly. That is, once rollers 155 are assembled into a bearing cage section, the bearing cage section can then be handled as a unit and rotated freely in space about various axes and to various orientations without causing the rollers 155 to fall out of the bearing cage section.

Another potential advantage of bearing retainers disclosed herein is increased resistance to radial distortion compared to conventional bearing cages, where radial distortion is motion of a bridge away from its ideal position inward or outward toward a race. Generally, contact between a bridge and a pair of rolling elements constrains the position and alignment of the rolling elements, and also constrains the position and alignment of the bridge. In variations disclosed herein, the position of the bridge may be further constrained by contact between its neighboring bridges and their rolling elements. In particular, if the bridges are interconnected by one or more rims, then radial outward (or inward) motion of one bridge tends to force a corresponding but oppositely directed inward (or outward) motion of neighboring bridges. This corresponding motion of the neighboring bridges is resisted by the resulting contact between those bridges and their rolling elements, which also tends to force the first bridge back toward its ideal position. This process may be particularly effective for bridge designs that provide contact with the rolling elements in the narrowest gap between the rolling elements and/or provide contact with the rolling elements on both sides of that narrowest gap.

Lubrication (oil or grease) is generally a critical requirement for rolling element bearings. The bearing retainers disclosed herein may provide a cavity in the bridge cross section which may be available to receive additional (overfill) oil or grease, which may provide an assembly and/or operational and maintenance benefit. In addition, the retainers disclosed herein may be configured to facilitate lubricant flow within the bearing, particularly through the rolling element/retainer contact regions, during operation. This may be accomplished, for example, by optimizing panel (e.g., inter-rolling element panel) interior edge contour for this purpose, providing additional holes or openings in the bridge connecting rims, or removing material from various of the retainer components. For example, FIG. 6 illustrates apertures (e.g., generally circular holes) 190 formed in the bridge back 120, while FIG. 5 illustrates apertures 190 (e.g., elongated slots) formed in each of the wings 150 and the blades 145. The size, shape, and location of the apertures 190 can vary as desired. In addition to, or as an alternative to apertures, scallops 191 (FIG. 5—showing a scallop on the blades 145) or other edge effects can also be added to portions of the bridge elements to facilitate lubricant distribution. Furthermore, FIG. 11 illustrates apertures 192 (e.g., elongated slots) formed in the rim elements 320, 170. Again, the size, shape, and location of the apertures 192 can vary as desired. In addition to, or as an alternative to apertures, scallops 193 (FIG. 11—showing scallops on the rim elements 320) or other edge effects can also be added to portions of the rim elements to facilitate lubricant distribution.

With respect to lubrication of the bearing, an additional potential benefit of the retainer configurations disclosed herein is a possible hydraulic action associated with a long (starting wide going to narrow) region on either side of the various panel/roller contact regions in combination with relative radial movement of the bridge with respect to the rolling elements.

This disclosure is illustrative and not limiting. Further modifications will be apparent to one skilled in the art in light of this disclosure and are intended to fall within the scope of the appended claims.

What is claimed is:

1. A bearing cage for use with a plurality of rolling elements in a bearing assembly, the bearing cage comprising:
    a plurality of bridge elements arranged to separate the rolling elements from each other and to retain the rolling elements in alignment in the bearing assembly, each of the bridge elements being formed of sheet material bent to define a partially hollow component; and
    at least one rim element connecting the plurality of bridge elements;
    wherein each of the plurality of bridge elements includes:
    a bridge back defined by first and second opposite ends and two opposite side edges; and
    first and second wings, each wing extending from a corresponding side edge of the bridge back, the wings being bent toward each other so that together the bridge back and the wings define at least a portion of the bridge element that is hollow; and
    a first blade extending from a side edge of the first wing and being bent relative to the first wing;
    wherein each bridge element is configured to contact a first rolling element of a pair of adjacent rolling elements with an outer surface of the first wing and a surface of the first blade, and is configured to contact a second rolling element of the pair of adjacent rolling elements with an outer surface of the second wing, to align and constrain the motion of the rolling elements such that the first blade and the first wing together provide only two angularly separated contact points as alignment-constraining regions for guidance of the first rolling element.

2. The bearing cage of claim 1, wherein each bridge element and the at least one rim element are formed from one or more planar sheet material blanks.

3. The bearing cage of claim 2, wherein at least one bridge element and the at least one rim element are integrally formed from the same planar sheet material blank.

4. The bearing cage of claim 1, wherein each of the wings is bent relative to the bridge back to define an acute angle therebetween, the bridge back and the wings forming a generally hollow triangular shape in cross section.

5. The bearing cage of claim 1, wherein an intersection between the bridge back and each wing is defined by a generally straight bend line.

6. The bearing cage of claim 1, wherein an intersection between the bridge back and each wing is defined by a curved bend line that imposes on each wing a curvature that conforms generally to a curved surface of the adjacent rolling element.

7. The bearing cage of claim 1, wherein the bridge elements further include
a second blade extending from a side edge of the second wing and being bent relative to the second wing;
wherein a surface of the second blade is configured to contact the second rolling element of the pair of adjacent rolling elements such that the second blade and the second wing together provide only two angularly separated contact points as alignment-constraining regions for guidance of the second rolling element.

8. The bearing cage of claim 7, wherein at least one of the first and second blades includes an embossment extending out of a plane defined by the respective first or second blade to define a minimum spacing between the first and second blades.

9. The bearing cage of claim 7, wherein the bridge elements further include
a first bottom wing extending from a side edge of the first blade and being bent relative to the first blade; and
a second bottom wing extending from a side edge of the second blade and being bent relative to the second blade;
wherein a surface of the first bottom wing is configured to contact the first rolling element of the pair of adjacent rolling elements to provide a third angularly separated alignment-constraining region for guidance of the first rolling element, and a surface of the second bottom wing is configured to contact the second rolling element of the pair of adjacent rolling elements to provide a third angularly separated alignment-constraining region for guidance of the second rolling element.

10. The bearing cage of claim 7, wherein the bridge elements further include
a petal extending from the second end of the bridge back and being bent relative to the bridge back, the extent of bend of the petal relative to the bridge back being limited by at least one of the first and second blades.

11. The bearing cage of claim 10, wherein the petal includes a slot and wherein at least one of the first and second blades includes a tab received in the slot.

12. The bearing cage of claim 1, wherein the bridge elements further include
a first bottom wing extending from a side edge of the first blade and being bent relative to the first blade;
wherein a surface of the first bottom wing is configured to contact the first rolling element of the pair of adjacent rolling elements to provide a third angularly separated alignment-constraining region for guidance of the first rolling element.

13. The bearing cage of claim 1, wherein at least one of the bridge back, the first wing, and the first blade includes an aperture to provide lubrication to the rolling elements.

14. The bearing cage of claim 1, wherein the at least one rim element includes a first rim element that interconnects first ends of a first group of the plurality of bridge elements, a second rim element that interconnects first ends of a second group of the plurality of bridge elements, and a third rim element interconnecting second ends of each of the first group and of the second group of the plurality of bridge elements to define a cage section that extends less than an overall circumferential dimension of the cage; and
wherein the first and second rim elements overlie one another such that each bridge element interconnected by the first rim element is positioned between a pair of bridge elements interconnected by the second rim element.

15. The bearing cage of claim 14, wherein the first rim element and the bridge elements interconnected by the first rim element are integrally formed from a single sheet material blank.

16. The bearing cage of claim 15, wherein the second rim element and the bridge elements interconnected by the second rim element are integrally formed from a single sheet material blank.

17. The bearing cage of claim 14, wherein the cage section is a first cage section of the cage, and wherein the cage further includes
a second cage section substantially similar to the first cage section; and
a splice that couples the first cage section to the second cage section.

18. The bearing cage of claim 17, wherein the splice includes at least two slots therein, one slot for receiving a tab extending from a bridge element of the first cage section and one slot for receiving a tab extending from a bridge element of the second cage section.

19. The bearing cage of claim 18, wherein a distance between the at least two slots is determined based upon the overall circumferential dimension of the cage.

20. The bearing cage of claim 14, wherein at least one of the rim elements includes an aperture or a scallop to provide lubrication to the rolling elements.

21. The bearing cage of claim 1, wherein at least one of the bridge back, the first wing, and the first blade includes a scallop to provide lubrication to the rolling elements.

22. A bearing assembly comprising:
a plurality of rolling elements; and
a plurality of bridge elements arranged between respective rolling elements to separate the rolling elements from each other and to retain the rolling elements in alignment in the bearing assembly, each of the bridge elements being formed of sheet material bent to define:
a bridge back defined by first and second opposite ends and two opposite side edges;
a wing extending from a side edge of the bridge back and being bent relative to the bridge back; and
a blade extending from a side edge of the wing and being bent relative to the wing;
wherein each bridge element is configured to contact a first rolling element of a pair of adjacent rolling elements with a surface of the wing, and is configured to contact the first rolling element of the pair of adjacent rolling elements with a surface of the blade, such that the blade and the wing together provide only two angularly separated contact points as alignment-constraining regions for guidance of the first rolling element.

23. The bearing assembly of claim 22, wherein the bridge elements define floating separators between the rolling elements.

24. The bearing assembly of claim 22, wherein the bridge elements further include
a bottom wing extending from a side edge of the blade and being bent relative to the blade;
wherein a surface of the bottom wing is configured to contact the first rolling element of the pair of adjacent rolling elements to provide a third angularly separated alignment-constraining region for guidance of the first rolling element.

25. The bearing assembly of claim 24, wherein the bridge elements define floating separators between the rolling elements.

26. A bearing cage for use with a plurality of rolling elements in a bearing assembly, the bearing cage comprising:

a plurality of bridge elements arranged to separate the rolling elements from each other and to retain the rolling elements in alignment in the bearing assembly, each of the bridge elements being formed of sheet material bent to define a partially hollow component; and a first rim element that interconnects first ends of a first group of the plurality of bridge elements, a second rim element that interconnects first ends of a second group of the plurality of bridge elements, and a third rim element interconnecting second ends of each of the first group and each of the second group of the plurality of bridge elements to define a cage section that extends less than an overall circumferential dimension of the cage; and wherein the first and second rim elements overlie and abut one another such that each bridge element interconnected by the first rim element is positioned between a pair of bridge elements interconnected by the second rim element.

27. The bearing cage of claim 26, wherein the first rim element and the bridge elements interconnected by the first rim element are integrally formed from a single sheet material blank and wherein the second rim element and the bridge elements interconnected by the second rim element are integrally formed from a single sheet material blank.

28. The bearing cage of claim 26, wherein the cage section is a first cage section of the cage, and wherein the cage further includes a second cage section substantially similar to the first cage section; and a splice that couples the first cage section to the second cage section.

29. The bearing cage of claim 28, wherein the splice includes at least two slots therein, one slot for receiving a tab extending from a bridge element of the first cage section and one slot for receiving a tab extending from a bridge element of the second cage section.

\* \* \* \* \*